May 30, 1933. A. C. DANKS 1,911,267

METER

Filed June 30, 1932

INVENTOR
Alfred C. Danks
by
James C. Bradley

Patented May 30, 1933

1,911,267

UNITED STATES PATENT OFFICE

ALFRED C. DANKS, OF CLEVELAND, OHIO

METER

Application filed June 30, 1932. Serial No. 620,067.

Figure 1:
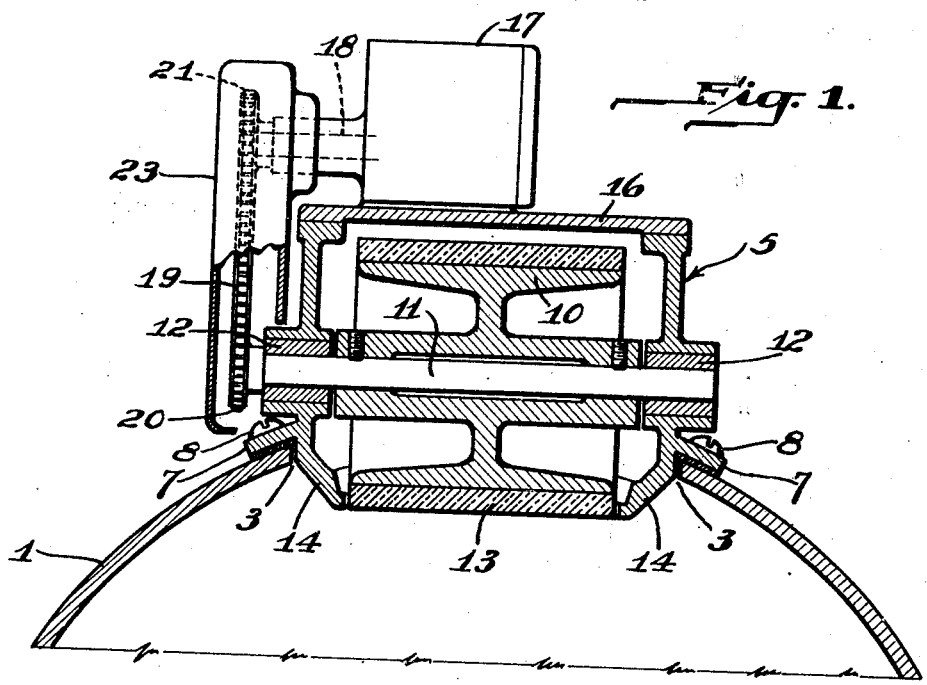
Figure 2:
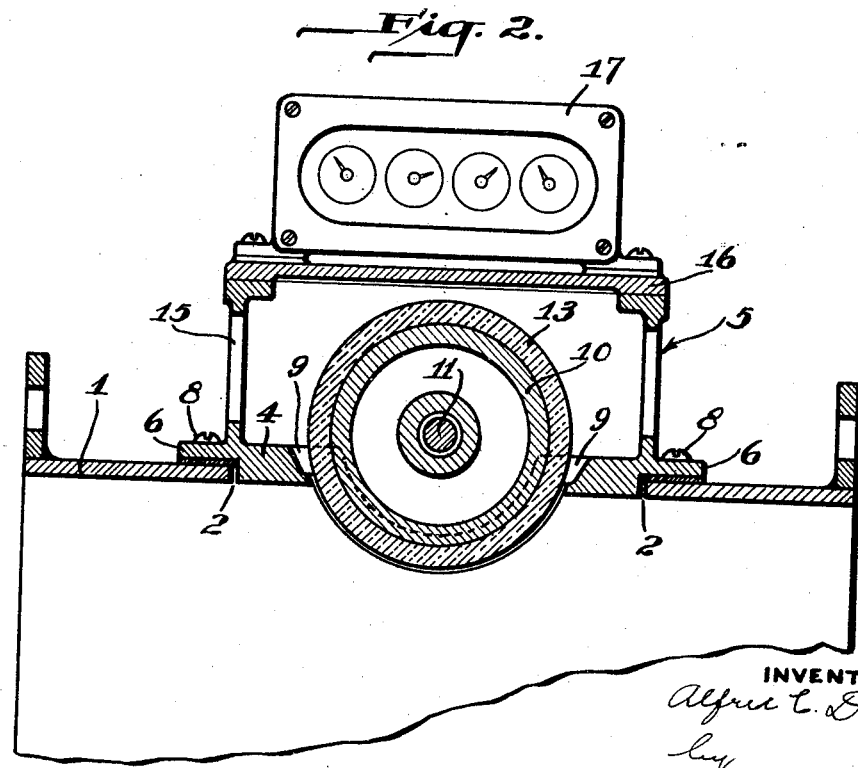

The invention relates to meters for measuring dry material passing through a conduit. The device is particularly designed for measuring pulverized fuel; such as coal, but is applicable for measuring other finely divided material, such as sand, crushed ore, grain and the like. The invention has for its objects the provision of an improved device of the character specified, which is cheap and simple in construction, and not liable to get out of order; which can be applied to practically any pipe without interfering noticeably with the passage of the material therethrough, and which will register reliably and accurately. One embodiment of the invention is shown in the accompanying drawing, wherein:

Figures 1 and 2 are sections through the apparatus, such sections being taken at right angles to each other.

Referring to the drawing, 1 is the wall of a pipe through which the material to be measured flows. Such wall is provided with a slot terminating at its ends at the points 2, 2 (Fig. 2) and at its sides at the points 3, 3 (Fig. 1). Seated in this slot is the lower wall 4 of the housing 5. The wall 4 is provided with two pairs of flanges 6, 6 and 7, 7 which overlap the outer surface of the pipe 1, and are secured in position by the screws 8.

The wall 4 of the housing is provided with a slot 9, and in this slot is mounted for rotation, the drum 10. The drum is pinned to a shaft 11 which rotates at its ends in the bushings 12, 12 carried by the side walls of the housing. The drum is provided with a tire 13, preferably of soft rubber and projects down into the pipe 1, as indicated in the drawing, giving the divided material passing through the pipe and filling it, an opportunity to engage the drum and turn it. Flanges 14, 14 (Fig. 1) carried by the housing project down into the pipe in proximity to the ends of the drum and act as closures therefor. They prevent the material in the pipe from jamming into the angle between each end of the drum and the pipe wall and thus restricting the freedom of rotation of the drum. The end walls of the housing are provided with the openings 15, 15 so that any finely divided material which works it way into the housing from the pipe 1 may find its way out or may be removed without difficulty, and thus prevent interference with the rotation of the drum such as might otherwise occur. The slot 9 is also sloped away from the drum, as indicated in Fig. 2, in order to reduce the tendency of fine material to obstruct the clearance space between the wall of the slot and the periphery of the drum, and restrict its freedom of rotation.

The housing 5 is provided with a removable cover plate 16 which carries the registering device 17. This may be of any approved type with the usual dial face (Fig. 2) and is calibrated to read in any desired units, such as bushels, tons, cubic feet or the like. The register is provided with a shaft 18 which drives the registering mechanism, and is itself driven from the shaft 11 of the drum by means of the chain 19 which passes around sprockets 20 and 21 on the ends of the shafts 11 and 18, the sprockets and chains being protected by a suitable guard 23.

What I claim is:

1. Apparatus for measuring the flow of finely divided material, comprising a pipe section having a slot in one of its walls, a metering wheel mounted for rotation with its periphery fitting into said slot and with its axis extending transversely of the axis of the pipe, a tire of yielding friction material on the drum, and a registering device connected to the drum.

2. Apparatus for measuring the flow of finely divided material, comprising a pipe section having a slot in one of its walls, a metering wheel mounted for rotation with its periphery fitting into said slot and with its axis extending transversely of the axis of the pipe, a tire of yielding friction material on the drum, a housing enclosing the drum open at its end in opposition to the periphery of the drum, and a registering device carried by the housing and connected to the drum.

3. Apparatus for measuring the flow of finely divided material, comprising a pipe section having a slot in one of its walls, a housing seated removably in the slot and having its inner wall provided with a slot, a metering wheel mounted for rotation in said last slot with its periphery fitting said slot, and with its axis extending transversely of the axis of the pipe, a tire of yielding friction material on the drum and a registering device on the casing connected to the drum.

In testimony whereof, I have hereunto subscribed my name this 27th day of June, 1932.

ALFRED C. DANKS.